DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1367

T889,022
ELECTROPHOTOGRAPHIC COMPOSITION AND ELEMENT

George A. Reynolds and James A. Van Allan, Kodak Park Works, Rochester, N.Y. 14650

Filed Oct. 5, 1970, Ser. No. 78,612
Int. Cl. G03g *5/06*
U.S. Cl. 96—1.5
No Drawing. 13 Pages Specification

Compounds having the formula:

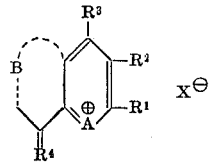

are sensitizers for photoconductors wherein $R^1$, $R^2$, $R^3$, and $R^4$ may represent separate moieties; wherein $R^1$ and $R^2$ may be taken together to complete a fused aromatic ring; wherein A represents a hetero atom, e.g. oxygen or sulfur; and wherein B represents a radical having the formula $-(CH_2)_{n-1}$ wherein $n$ represents a positive integer having a value of from 2 to 9.